United States Patent
Turner

(10) Patent No.: US 7,238,274 B2
(45) Date of Patent: Jul. 3, 2007

(54) COMBINED HYDROTREATING AND PROCESS

(75) Inventor: James Turner, Sugarland, TX (US)

(73) Assignee: Fluor Technologies Corporation, Aligo Viejo, CA (US)

(*) Notice: Subject to any disclaimer, the term of this patent is extended or adjusted under 35 U.S.C. 154(b) by 481 days.

(21) Appl. No.: 10/478,703

(22) PCT Filed: Apr. 3, 2002

(86) PCT No.: PCT/US02/10499
§ 371 (c)(1),
(2), (4) Date: May 3, 2004

(87) PCT Pub. No.: WO03/084632
PCT Pub. Date: Oct. 16, 2003

(65) Prior Publication Data
US 2004/0188328 A1 Sep. 30, 2004

(51) Int. Cl.
C10G 65/00 (2006.01)
B01J 8/04 (2006.01)

(52) U.S. Cl. ............ 208/58; 208/59; 208/80; 208/89; 208/97; 422/190

(58) Field of Classification Search ............... 422/190; 208/58, 59, 89, 97, 80
See application file for complete search history.

(56) References Cited

U.S. PATENT DOCUMENTS

| | | | | |
|---|---|---|---|---|
| 4,344,840 A * | 8/1982 | Kunesh | | 208/59 |
| 5,904,835 A * | 5/1999 | Thakkar | | 208/78 |
| 6,217,746 B1 * | 4/2001 | Thakkar et al. | | 208/59 |
| 6,547,956 B1 * | 4/2003 | Mukherjee et al. | | 208/58 |
| 6,676,828 B1 * | 1/2004 | Galiasso et al. | | 208/58 |
| 6,797,154 B2 * | 9/2004 | Mukherjee et al. | | 208/58 |
| 2003/0111385 A1 * | 6/2003 | Cash et al. | | 208/58 |
| 2004/0173503 A1 * | 9/2004 | Stupin et al. | | 208/108 |

* cited by examiner

Primary Examiner—N. Bhat
(74) Attorney, Agent, or Firm—Fish & Associates, PC

(57) ABSTRACT

First (210) and second (240) feedstocks are hydrotreated in an integrated hydrogenation plant (200) using a hot separator (230) that provides a vapor stream containing at least some of the hydrotreated first feedstock (210), wherein the second feedstock (240) is mixed with the vapor stream at a position downstream of the separator (240) and upstream of the a second hydrotreating (250) reactor to form a mixed second feedstock that is fed into the second hydrotreating reactor (250) to produce a ultra-low sulfur product.

19 Claims, 2 Drawing Sheets

COMBINED HYDROTREATING AND PROCESS

FIELD OF THE INVENTION

The field of the invention is petrochemistry, and particularly hydrotreating of diesel and fluid catalytic cracking gas oil feedstocks.

BACKGROUND OF THE INVENTION

Hydrotreating is a commonly used process in many modern refineries, in which hydrogen is contacted in the presence of a catalyst with a hydrocarbonaceous feedstock to remove impurities, including oxygen, nitrogen, sulfur, and unsaturated hydrocarbons. Consequently, hydrotreating is frequently employed to reduce the sulfur content from refined intermediates and is also commonly referred to as hydrodesulfurization. Hydrodesulfurization is typically used within a refinery in combination with processes including feed pretreatment of catalytic reformers, catalytic crackers, and hydrocrackers, product quality improvement for naphtha, diesel, jet, heating oil and residues, saturation of olefins, and polycyclic aromatics. There are numerous hydrotreating configurations and processes known in the art, and continuous efforts to reduce energy and material consumption led to integration of hydrotreating reactors in various processes.

For example, in one integration concept, a hydrotreater is combined with a hydrocracker as disclosed in U.S. Pat. No. 3,328,290 to Hengstebeck that describes a two-stage hydrocracking process wherein fresh feed is combined with effluent from the hydrocracking stage and the combined streams are then introduced into a hydrotreating stage. A higher-boiling fraction is then separated from the hydrotreater effluent and fractionated to produce a light product and a heavier-bottoms stream, which is then recycled with hydrogen-containing gas back to the hydrocracking stage.

Another example U.S. Pat. No. 6,235,190 to Bertram describes an integrated hydrotreating and hydrocracking process in which two hydrotreating catalysts of different activity are operated in series to provide improved products that are then subjected to a hydrocracking process to convert the hydrotreated effluent to lighter products with a reduced aromatic hydrocarbon content.

In a further example, as described in U.S. Pat. No. 6,261,441 to Gentry et al., a combined hydrotreating/hydrocracking process is described in which a hydrocracking stage is followed by a hydrodewaxing stage with a single feed and a bottoms fraction recycle to produce a naphtha product, a distillate boiling above the naphtha range, and a lubricant.

In yet another system, as described in U.S. Pat. No. 6,328,879 to Kalnes, two independent feedstocks are hydrocracked in a catalytic hydrocracking process that employs a hydrocracking zone, a hydrotreating zone, and a high pressure product stripper to produce various products from two feedstocks, wherein the products have a lower boiling point range than the feedatocks.

Alternatively, more than one hydrotreater reactor, and or catalyst beds may be employed for catalytic hydrogenation as described in U.S. Pat. No. 3,537,981 to Parker, or U.S. Pat. No. 6,103,105 to Cooper. While Parker's process employs a first hydrotreating reactor coupled to a separator that is in series with a second hydrotreating reactor, Cooper et al. employ two serially connected hydrotreating catalyst beds without the use of a separator. However, both Coopers and Parkers configuration are typically limited to only a single feedstock. Alternatively, as described in U.S. Pat. No. 5,958,218 to Hunter, two hydrocarbon feedstocks are hydrotreated in parallel while hydrogen flows in series between the reactors. While Hunters configuration allows hydrotreating of two at least somewhat different feedstocks, the catalytic reactors will generally operate at different hydrogen partial pressures. Consequently, the balance of the feedstocks will have to be properly balanced with the particular hydrogen partial pressures to yield the desired products.

Thus, although many integrated processes have provided at least some advantage over other known configurations and methods, such configurations and methods are frequently limited to processes involving hydrocracking, or hydrotreating of a single boiling range (e.g., naphtha, diesel, gasoil, resid) feedetock. Consequently, all or almost all of the known hydrotreating processes require separate plants where more than one feedstock is employed. Therefore, there is still a need to provide improved configurations and methods for hydrotreating of petroleum products.

SUMMARY OF THE INVENTION

The present invention is directed to configurations and methods for hydrotreating plants, and especially for integrated hydrotreating plants in which at least two feedstocks with different boiling point ranges (e.g., gas oil and diesel oil) are hydrogenated.

In one aspect of the inventive subject matter, contemplated plants include a first hydrotreating reactor that receives a first feedstock and produces a hydrotreated first feedstock and further include a hot separator that receives the hydrotreated first feedstock and produces a hot hydrotreated liquid and a hot hydrotreated vapor that contains at least a portion of the hydrotreated first feedstock. At least a portion of the hot hydrotreated vapor is mixed with a second feedstock to form a mixed second feedstock that is fed into a second hydrotreating reactor to form a product, wherein the second feedstock has a boiling point range that is lower than the first feedstock. This configuration is especially applicable where the sulfur content of the product of the second hydrotreating reactor must be maintained at a very low level.

In a further contemplated aspect, a gas oil first feedstock and diesel oil second feedstock are considered especially advantageous, especially where the charge rate of the first feedstock and the second feedstock have a ratio of between about 1:1 to about 1:2. Where appropriate, first and/or second hydrotreating reactors may further receive a hydrogen-containing stream, some or all of which may be recycled in the plant from an effluent of the second hydrotreating reactor or may be a makeup hydrogen stream. Furthermore, it is contemplated that configurations according to the inventive subject matter may be realized in a new plant. However, the hot separator and the second hydrotreating reactor may also be integrated as an upgrade into an existing hydrotreating plant.

Consequently, a method of hydrotreating may comprise a step in which a first feedstock is hydrotreated in a first hydrotreating reactor to produce a hydrotreated first feedstock. In another step, the hydrotreated first feedstock is fed into a hot separator that produces a hot hydrotreated liquid and a hot hydrotreated vapor that contains at least a portion of the hydrotreated first feedstock, and in yet another step, at least a portion of the hot hydrotreated vapor is mixed with a second feedstock to form a mixed second feedstock. In a still further step, the mixed second feedstock is fed into a second hydrotreating reactor to form a product.

DETAILED DESCRIPTION

Figure 1:
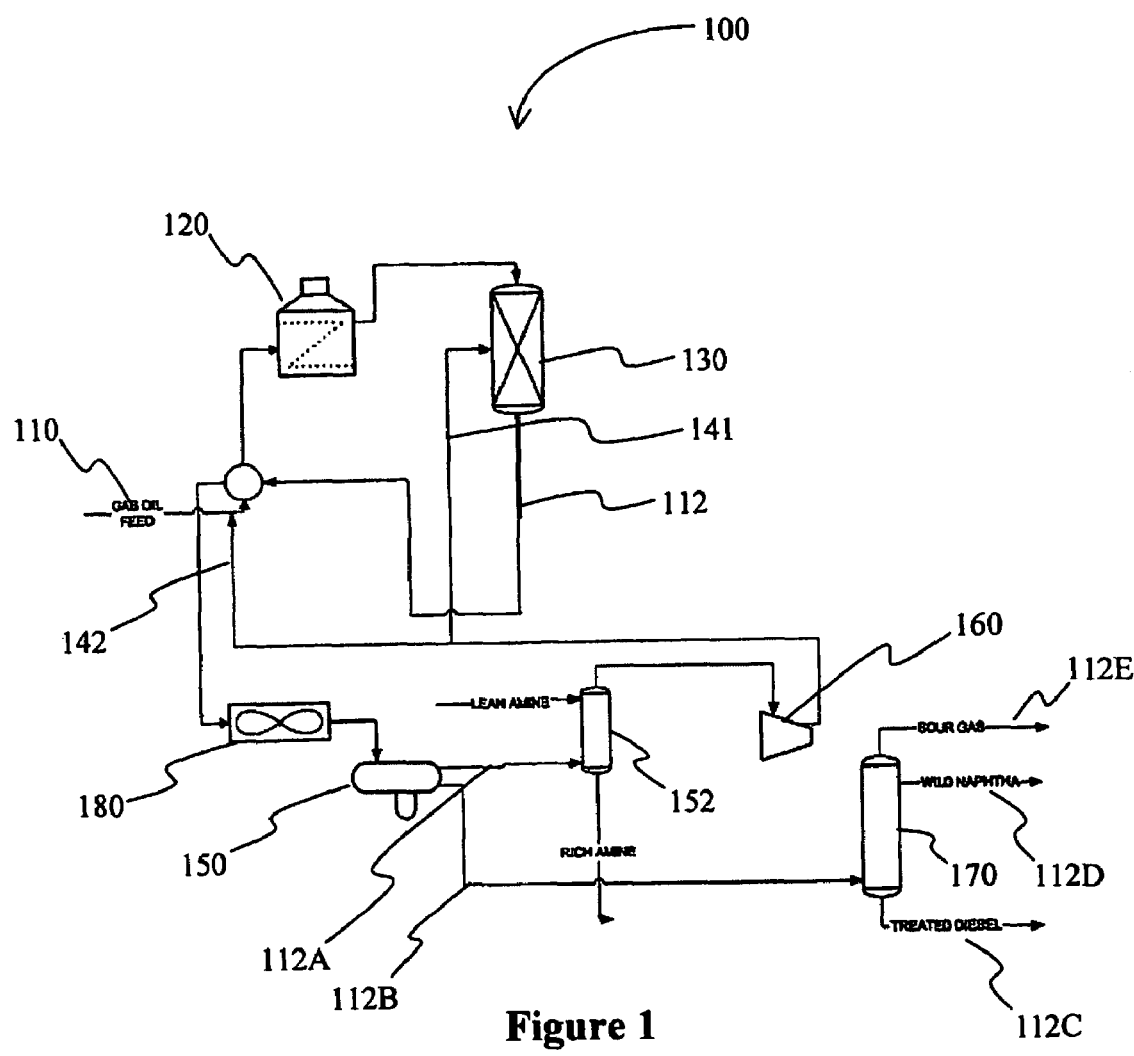
FIG. 1 is a schematic view of an exemplary configuration of a prior art hydrotreating plant.

Various known configurations and processes for desulfuration and/or denitrification using hydrotreating of a feedstock employ a hydrotreating reactor in which a hydrocarbonaceous feed is reacted with hydrogen in the presence of a catalyst to form $H_2S$ and/or $NH_3$ from sulfur- and/or nitrogen-containing compounds in the feed. Prior art FIG. 1 depicts a typical configuration 100 for such plants. Here, a single feedstock (e.g., diesel) 110 is passed through a heater 120 and subsequently fed into a hydrotreating reactor 130. Hydrogen (separately [via line 141], or in combination [via line 142] with the feedstock) is added to the catalyst in the hydrotreating reactor and the hydrotreated product 112 is (after a cooling step in cooler 180) separated in separator 150 into a gaseous portion 112A, which predominantly comprises hydrogen and hydrogen sulfide, and a liquid portion 112B, which comprises hydrotreated gas oil, wild naphtha, and remaining sour gas. The hydrogen from the gaseous portion is typically purified in an absorber 152 with an amine-containing solvent, and recycled (supra) into the hydrogen reactor via compressor 160. The hydrotreated feed 112C can then be retrieved from column 170 along with wild naphtha 112D and sour gas 112E. While such configurations work relatively well for a single type of feedstock (e.g., gas oil, diesel, etc.), known plants with multiple feedstocks (e.g., gas oil and diesel) generally require multiple and separate hydrotreating configurations, which add significant cost to construction and operation of such plants.

In their efforts to improve configurations and methods for hydrotreating hydrocarbonaceous feeds, the inventors have discovered that multiple types of feedstock (i.e., feedstocks with different boiling point ranges—e.g., gas oil and diesel) can be hydrotreated in an integrated configuration, in which a hot separator is fluidly couple( hydrotreating reactor, and in which a single hydrogen recycling loop (e.g., comprising a cooler or heat exchanger, a liquid/gas separator, an amine scrubber, and a compressor) can be employed for both hydrogen reactors.

Thus, in a particularly preferred aspect of the inventive subject matter, a plant comprises a first hydrotreating reactor that receives a first feedstock and produces a hydrotreated first feedstock and a hot separator that receives the hydrotreated first feedstock and produces a hot hydrotreated liquid and a hot hydrotreated vapor that contains at least a portion of the hydrotreated first feedstock, wherein at least a portion of the hot hydrotreated vapor is mixed (preferably at a position downstream of the separator and upstream of the second hydrotreater) with a second feedstock to form a mixed second feedstock that is fed into a second hydrotreating reactor to form a product, and wherein the second feedstock has a boiling point range that is lower than the first feedstock. In further contemplated aspects, the separator, the first hydrotreating reactor, and the second hydrotreating reactor are operated such that the product has a sulfur content of less than 100, more preferably less than 50, and most preferably less than 15 ppm.

Figure 2:
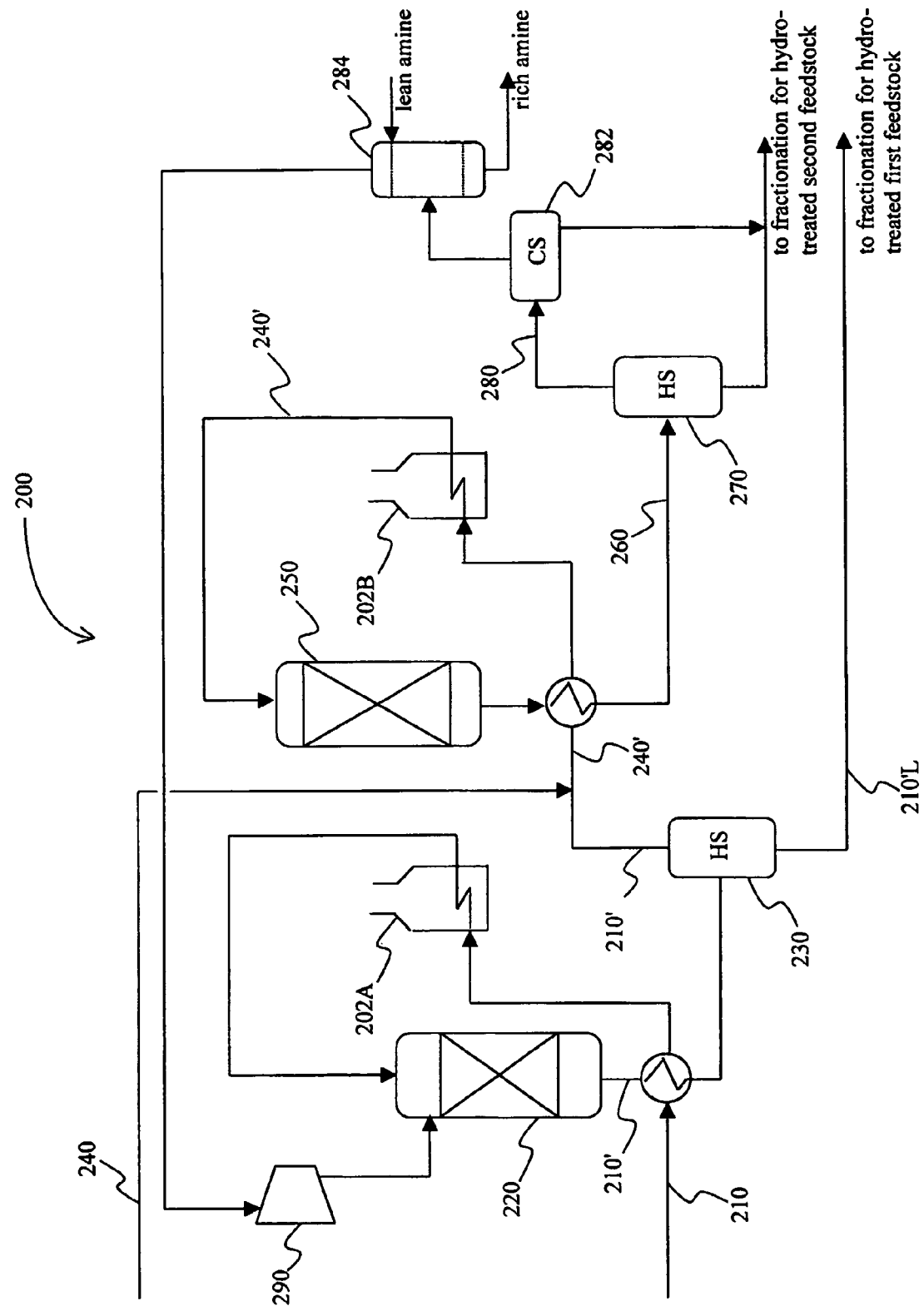
FIG. 2 is a schematic view of an exemplary configuration of a hydrotreating plant according to the inventive subject matter.

FIG. 2 depicts an exemplary configuration of a hydrotreating plant 200, in which two different hydrocarbonaceous feedstocks are hydrotreated using an integrated configuration with a single hydrogen recycle loop. Here, first feedstock 210 (e.g., gas oil ) is heat exchanged against the hydrotreated first feedstock 210' and further heated in heater 202A before introduction into the first hydrotreating reactor 220. The hydrotreated first feedstock 210' is then fed into hot separator 230 that is operated under conditions to separate hydrotreated first feedstock 210' into hot hydrotreated liquid 210'L and hot hydrotreated vapor 210'V, wherein the hot hydrotreated vapor 210'V contains at least a portion of the hydrotreated first feedstock 210'. The hot hydrotreated vapor 210'V is then mixed with the second feedstock 240 (e.g., diesel feed) to form a mixed second feedstock 240' that is fed (after heat exchange against product 260 and further heating in heater 202B) into the second hydrotreating reactor 250. The second hydrotreating reactor 250 produces product 260. A downstream separator 270 recovers at least a portion of the hydrogen from the product 260, and the recovered hydrogen is fed into a hydrogen recycle loop 280 (including cold separator 282 and absorber 284) that eventually provides at least part of the hydrogen used in the first separator via compressor 290. Thus, it should be recognized that in contemplated configurations, the hot separator is operated such that at least a portion of the feedstock is separated from the hydrotreated feedstock and fed into the hydrotreating reactor in which the second feedstock is hydrotreated.

It should be especially appreciated that the terms "hydrotreating reactor" and "hydrocracking reactor" are not referring to the same type of reactor. As used herein, the term "hydrotreating reactor" refers to a reactor in which a hydrocarbon-containing feed is reacted with hydrogen in the presence of a catalyst under conditions that (a) result in less than 15% conversion, and more typically less than 10% conversion, and (b) result in the formation of $H_2S$ and/or $NH_3$ from sulfur- and nitrogen-containing compounds in the hydrocarbon-containing feed. In contrast, the term "hydrocracking reactor" as used herein refers to a reactor in which a hydrocarbon-containing feed is converted to lighter products (i.e., the average molecular weight decreases), wherein the term "conversion" or "converted" means that a particular percentage of fresh feed changes to middle distillate, gasoline and lighter products (see e.g., "Hydrocracking Science And Technology" by J. Scherzer and A. J. Gruia; Marcel Decker, Inc.). Thus, contemplated hydrocracking reactors will have a conversion of at least 15%, more typically at least 30%, and most typically at least 50%.

As also used herein, the term "hot separator" refers to a separator that is fluidly coupled to at least two hydrotreating reactors such that the hot separator receives an at least partially hydrotreated (or otherwise at least partially purified) first feedstock at a temperature of about 400° F. and higher, and wherein the hot separator produces a hot hydrotreated vapor that (a) contains at least a portion of the first feedstock and (b) is feed into a second hydrotreating reactor.

With respect to the first and second feedstocks (210 and 240, respectively) it should be appreciated that various hydrocarbonaceous feedstocks are considered suitable for use herein, and in especially contemplated aspects the first hydrocarbonaceous feedstock comprises gas oil and the second hydrocarbonaceous feedstock comprises diesel. In a still further especially contemplated aspect, the second hydrocarbonaceous feedstock may also comprise cycle oil from an upstream FCC (fluid catalytic cracking) reactor. However, in alternative aspects, suitable hydrocarbonaceous feedstocks also include crude or partially purified petroleum fractions, including light gas oil, heavy gas oil, straight run gas oil deasphalted oil, kerosene, jet fuel, etc. Furthermore, it is generally preferred that suitable first and second hydrocarbonaceous feedstocks have different boiling point ranges, wherein the first hydrocarbonaceous feedstock typically has a boiling point range that is higher (at least 5 degrees centigrade, more typically at least 10 degrees centigrade, and most typically at least 25 degrees centigrade as measured from the initial boiling point in the boiling point range) than the second boiling point range.

Contemplated hot separators are preferably operated under conditions that will allow separation of the hydrotreated first feedstock into a liquid portion and a vapor portion, wherein the vapor portion comprises at least a part of the hydrotreated first feedstock. Thus, it is generally preferred that contemplated hot separators will receive hydrotreated first feedstock that is not, or only partially cooled (e.g., by heat exchange with first feedstock). Consequently, it should be appreciated that suitable operation temperatures for contemplated hot separators are generally above 300° F., more typically above 400° F., and most typically in a range between about 450° F. and 550° F.

Furthermore, it is contemplated that appropriate hot separators will be operated at a pressure that is at or close to the pressure in the first hydrotreating reactor and at a pressure that is at or above the pressure of the second hydrotreating reactor. Consequently, suitable hot separators will typically be operated at between about 1000-2500 psi, and more typically at a pressure of about 1200 psi and about 2400 psi. However, where suitable it should be appreciated that the pressure may also be less than 1000 psi and especially contemplated lower pressures are generally between 1000 to 400 psi, and even less. Similarly, where hydrotreating conditions allow, hot separators may also be operated at a pressure above 2500 psi, and suitable higher pressures include pressures between 2500 to 4000 psi, and even higher.

With respect to the vapor comprising at least a portion of the hydrotreated first feedstock, it should be recognized the vapor will include significant quantities (i.e., at least 20 mol %, more typically at least 35 mol %) of hydrogen that has not reacted with components of the first feedstock in the first hydrotreating reactor. Furthermore, it is contemplated that the portion of the hydrotreated feedstock in the vapor may vary considerably, and will, among other parameters, typically depend on the quality of the first feedstock and the temperature and pressure conditions under which the hot separator is operated.

With respect to the composition of contemplated portions of the hydrotreated first feedstock in the vapor, it should be recognized that a particular composition of such portions will predominantly depend on the particular composition and nature of the first feedstock. However, it is generally contemplated that preferred compositions contain at least some material with a boiling point range that lies within the boiling point range of the second feedstock.

Dimensions and capacities of contemplated hydrotreating reactors will typically depend at least in part on the particular feedstock, and the overall throughput capacity of the hydrogenation plant. Thus, it is contemplated that all known hydrotreating reactors are suitable for use herein. However, it is generally preferred that the hydrotreating reactors will be operated under conditions that ensure hydrogenation at a relatively low level of hydrocracking (i.e., less than 15% conversion, more typically less than 10% conversion). Consequently, the nature of the catalyst may vary considerably. However, preferred hydrotreating catalysts will include those comprising cobalt, molybdenum and/or nickel distributed on a carrier (e.g., alumina extrudate).

Furthermore, it should be recognized that by fluidly coupling the first hydrotreating reactor to the second hydrotreating reactor via the hot separator, the second reactor may be operating at a significantly higher pressure than a traditional standalone unit, which in turn will further reduce the amount of required catalyst for hydrotreating the second feed. It should be especially recognized that in preferred aspects of the inventive subject matter both hydrotreating reactors are operated under conditions effective to reduce the concentration of sulfur- and/or nitrogen-containing compounds in both feedstocks. Consequently, it should be recognized that in preferred configurations both feedstocks are substantially not (i.e., less than 10%, more typically less than 8%) converted to lower boiling point products. In further particularly preferred aspects, the second feedstock comprises diesel, and the diesel contains after hydrotreating and column separation less than 50 ppm, more preferably less than 25 ppm, and most preferably less than 10 ppm sulfur-containing products.

First and second hydrotreating reactors will preferably operate at temperatures that allow hydrotreating of the feedstock with a particular catalyst without significant hydrocracking (i.e., with less than 15% conversion, and more preferably less than 10% conversion). Consequently, preferred temperatures will generally be in the range of about 500° F. to about 800° F., and more preferably between about 550° F. to about 750° F. However, it should be recognized that depending on the particular feedstock of the first and second reactors, the temperatures may vary accordingly. With respect to the temperature regulation in the second hydrotreater, it should be recognized that the temperature in the second hydrotreating reactor may also be regulated by the amount of the second feedstock that is fed into the second reactor. Moreover, it should be recognized that the second hydrotreating reactor may be operated to a relatively large extent through the heat and pressure provided by the first hydrotreating reactor.

Similarly, the pressure of the first and second hydrotreating reactors may vary considerably, and a particular pressure will be at least in part determined by the particular feedstocks and catalysts employed for the hydrogenations. However, it is generally contemplated (a) the operating pressure of the first hydrotreating reactor will be equal to or higher than the operating pressure of the second hydrotreating reactor, and (b) that suitable pressures will generally be in the range of between about 1000 psi and 2400 psi. In further preferred aspects of the inventive subject matter, it is contemplated that the operating pressure in the second reactor is between 0 and 300 psi less, and more preferably between 0 and 150 psi less than the operating pressure in the first reactor.

Moreover, it should be recognized that by integration of two hydrotreating reactors into contemplated configurations, costs for construction and operation of contemplated plants will be significantly reduced. For example, it is contemplated that the cost for a hydrogen recycle compressor in contemplated configurations will be substantially lower than the cost for two independent recycle compressors. In yet another contemplated aspect, it is contemplated that the required capacity increase for the heat exchanger and cooler within the recycle loop will be moderate to insignificant.

It should also be appreciated that suitable configurations may include additional hydrotreating reactors (i.e., a third reactor, a fourth reactor, etc.) and separators, wherein each of the additional reactors are fluidly coupled to an existing or preceding reactor via a separator that receives the product of the existing or preceding reactor. With respect to the components (e.g., piping, hydrotreating reactor, compressor, heat exchanger, etc.) in contemplated configurations, it is contemplated that all known and commercially available components may be employed. Thus, contemplated configurations may be employed for production of two products having different boiling ranges and different product specifications, wherein such configurations may be realized in a new plant as well as implemented as an upgrade to an existing plant For example, an existing gas oil hydrotreater upstream of a FCC unit may be upgraded to include a second reactor (or reactor section) for producing high quality low sulfur diesel fuel.

Consequently, a method of operating a plant may comprise a step in which a first feedstock is hydrotreated in a first hydrotreating reactor to produce a hydrotreated first feedstock. In another step, the hydrotreated first feedstock is fed into a hot separator that produces a hot hydrotreated liquid and a hot hydrotreated vapor that contains at least a portion of the hydrotreated first feedstock. In a further step, at least a portion of the hot hydrotreated vapor is mixed with a second feedstock to form a mixed second feedstock, and in a still further step, the mixed second feedstock is fed into a second hydrotreating reactor to form a product, wherein the second feedstock has a boiling point range that is lower than the first feedstock. With respect to the first and second hydrotreating reactors, the hot separator, the feedstocks, and the product, the same considerations as described above apply.

Thus, specific configurations and methods of combined hydrotreating have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system for integrated hydrotreating of a first and a second feedstock with different boiling point ranges, comprising:
   a first hydrotreating reactor that receives a first feedstock and produces a hydrotreated first feedstock;
   a first hot separator configured to receive the hydrotreated first feedstock and to produce a first hot hydrotreated liquid and a hot hydrotreated vapor that contains at least a portion of the hydrotreated first feedstock;
   wherein the first hydrotreating reactor is configured such that the first hydrotreated liquid has a conversion of less than 15% relative to the first feedstock;
   wherein the system is further configured such that at least a portion of the hot hydrotreated vapor is mixed with a second feedstock to form a mixed second feedstock;
   a second hydrotreating reactor that is configured to receive the mixed second feedstock and to form a product, wherein the second hydrotreating reactor is configured such that the product has a conversion of less than 15% relative to the mixed second feedstock;
   a second hot separator configured to receive the product and to form a liquid product; and
   wherein the second feedstock has a boiling point range that is lower than a boiling point range of the first feedstock.

2. The system of claim 1 further comprising a first conduit configured to feed the first hydrotreated liquid to a first fractionation zone, and a second conduit configured to feed the liquid product to a second fractionation zone.

3. The system of claim 2 wherein the hot separator is operated at a pressure of between about 1200 psi and about 2400 psi, and at a temperature of between about 450° F. and 550°0 F.

4. The system of claim 1 wherein the first hydrotreating reactor operates at a first pressure and the second hydrotreating reactor operates at a second pressure, and wherein the second pressure is between 0 and 300 psi less than the first pressure.

5. The system of claim 4 wherein the first pressure is a pressure between about 1000 psi and 2400 psi.

6. The system of claim 1 wherein the first feedstock comprises gas oil.

7. The system of claim 6 wherein the second feedstock comprises diesel oil.

8. The system of claim 7 wherein the first feedstock and the second feedstock have a ratio of between about 1:1 to about 1:2.

9. The system of claim 1 wherein the at least one of the first and second hydrotreating reactors further receive a hydrogen-containing stream.

10. The system of claim 9 wherein at least a portion of the hydrogen-containing stream is recycled in the plant from an effluent of the second hydrotreating reactor.

11. The system of claim 9 wherein at least a portion of the hydrogen rich stream is a makeup hydrogen stream.

12. The system of claim 1 wherein the hot separator and the second hydrotreating reactor are integrated as an upgrade into an existing hydrotreating plant.

13. A method of hydrotreating comprising:
   hydrotreating a first feedstock in a first hydrotreating reactor to produce a hydrotreated first feedstock at a conversion rate of less than 15%;
   feeding the hydrotreated first feedstock into a hot separator that produces a hot hydrotreated liquid and a hot hydrotreated vapor that contains at least a portion of the hydrotreated first feedstock;
   mixing at least a portion of the hot hydrotreated vapor with a second feedstock to form a mixed second feedstock, and routing the hot hydrotreated liquid to a first fractionation zone;
   feeding the mixed second feedstock into a second hydrotreating reactor to form a product, feeding the product in a second hot separator to thereby form a product liquid, and routing the product liquid to a second fractionation zone; and
   wherein the second feedstock has a boiling point range that is lower than a boiling point range of the first feedstock.

14. The method of claim 13 wherein the first feedstock comprises gas oil and wherein the second feedstock comprises diesel.

15. The method of claim 13 wherein the hot separator is operated at a temperature of between about 450° F. and 550° F. and a pressure of between about 1200 psi and about 2400 psi.

16. The method of claim 15 wherein the first hydrotreating reactor operates at a first pressure and the second hydrotreating reactor operates at a second pressure, and wherein the second pressure is between 0 and 300 psi less than the first pressure.

17. The method of claim 16 wherein the first pressure is a pressure between about 1000 psi and 2400 psi.

18. The method of claim 13 wherein the first feedstock and the second feedstock have a ratio of between about 1:1 to about 1:2.

19. The method of claim 13 wherein the hot separator and the second hydrotreating reactor are integrated as an upgrade into an existing hydrotreating plant.

* * * * *